(12) United States Patent
Erez et al.

(10) Patent No.: US 11,616,857 B2
(45) Date of Patent: *Mar. 28, 2023

(54) SYSTEM AND METHOD FOR PROVIDING REAL-TIME LOCKLESS PARALLEL SCREEN RECORDING COMPLIANCE ENFORCEMENT TO OMNI CHANNEL CLOUD SYSTEMS

(71) Applicant: NICE LTD., Ra'anana (IL)

(72) Inventors: Jonathan Erez, Kfar Saba (IL); Ofir Mecayten, Karkur (IL); Yaron Cohen, Modiin (IL)

(73) Assignee: NICE LTD., Ra'anana (IL)

( * ) Notice: Subject to any disclaimer, the term of this patent is extended or adjusted under 35 U.S.C. 154(b) by 22 days.

This patent is subject to a terminal disclaimer.

(21) Appl. No.: 17/727,855

(22) Filed: Apr. 25, 2022

(65) Prior Publication Data
US 2022/0303359 A1  Sep. 22, 2022

Related U.S. Application Data

(63) Continuation of application No. 17/207,692, filed on Mar. 21, 2021, now Pat. No. 11,343,346.

(51) Int. Cl.
*H04L 67/568* (2022.01)
*H04M 3/51* (2006.01)
*H04M 3/42* (2006.01)

(52) U.S. Cl.
CPC ...... *H04L 67/568* (2022.05); *H04M 3/42221* (2013.01); *H04M 3/5175* (2013.01); *H04M 2203/558* (2013.01)

(58) Field of Classification Search
CPC ..... H04M 3/42–3/42238; H04M 3/50–3/5191; H04L 67/28–67/672842; H04L 67/568–67/5683
See application file for complete search history.

(56) References Cited

U.S. PATENT DOCUMENTS 9,479,727 B1 * 10/2016 Kolodizner ......... H04M 3/5183
9,514,333 B1 * 12/2016 Patel ....................... G06F 21/10
10,176,472 B1 * 1/2019 Peterson ................ G06Q 20/24
10,529,336 B1 * 1/2020 Matthews ............. H04M 1/271
(Continued)

*Primary Examiner* — Clayton R Williams
(74) *Attorney, Agent, or Firm* — Soroker Agmon Nordman (57) ABSTRACT

A computerized-method for providing real-time lockless parallel screen recording compliance enforcement to omnichannel cloud systems, is provided herein. In a processor of a client computer configured to execute code for recording events of one or more voice or digital interactions, on one or more screens associated to the client computer, the computerized-method maintains a cache for storing a masked state. Each interaction is having an associated interaction identifier and upon receiving a screen event from a server of a cloud-based video recording that is communicating with the client computer over a communication network, operating a compliance-enforcement module. The compliance-enforcement module includes updating the cache; and operating a module of recording of screen events for the screen events of the one or more voice or digital interactions. Thus, by updating in real-time the cache on the client computer refraining from database locks in the server of the cloud-based video recording.

13 Claims, 9 Drawing Sheets

(56) References Cited

U.S. PATENT DOCUMENTS

| | | | |
|---|---|---|---|
| 10,728,384 B1* | 7/2020 | Channakeshava | G06F 21/6245 |
| 10,757,258 B1* | 8/2020 | Hardebeck | H04L 65/1076 |
| 2012/0027195 A1* | 2/2012 | Shaffer | H04M 3/42221 |
| | | | 379/265.09 |
| 2015/0378561 A1* | 12/2015 | Ollinger | G06Q 30/016 |
| | | | 707/769 |
| 2019/0013038 A1* | 1/2019 | Thomson | G06F 40/20 |
| 2019/0258825 A1* | 8/2019 | Krishnamurthy | H04M 3/205 |
| 2020/0020340 A1* | 1/2020 | Sheikh | G10L 25/48 |

* cited by examiner

SYSTEM AND METHOD FOR PROVIDING REAL-TIME LOCKLESS PARALLEL SCREEN RECORDING COMPLIANCE ENFORCEMENT TO OMNI CHANNEL CLOUD SYSTEMS

RELATED APPLICATIONS

This application claims priority as a continuation from application Ser. No. 17/207,692 dated Mar. 21, 2021, the disclosure of which is incorporated herein by reference.

FIELD OF THE INVENTION

The present invention relates to video recordings, and more specifically to a method and system for providing real-time lockless parallel screen recording compliance enforcement to omni channel cloud systems.

BACKGROUND OF THE INVENTION

Contact centers provide customer service for their products and/or services. To track the efficiency of the agents and for quality control of service purposes, the agent interactions are being monitored and/or recorded. A computer device of each agent may be associated to multiple monitors, displays, or screens which are used to provide different information to the agent simultaneously in real time during one or more interactions, such as, information regarding the customer, the product and/or services in question, or to update customer related information in the contact center systems. Internal interactions, such as interactions between the agent and a supervisor or other colleagues may be also recorded for quality management purposes.

Contact Center as a Service (CCaaS) is a software deployment model that enables organizations to purchase only the technology that they need and to integrate the CCaaS to their existing technology. The CCaaS is commonly operated by a vendor to reduce Information Technology (IT) integration and support costs. Commonly, in the current CCaaS, for Quality Management (QM) processes, interaction events, which include the information presented to the agent, via one or more screens, that are associated to the computer device and/or accessed by an input device, during each customer call, are recorded, by a cloud computing service, into a video recording along with the audio and/or video portion of the conversation between the customer and the agent.

Furthermore, current CCaaS are often operating in a blended agent model by which agents simultaneously handle multiple interactions of different media types, e.g., omni channel. The omni channel interactions may be handled via voice and different digital channel types, such as, chat, live video, email, and messaging services, like WhatsApp. Accordingly, for monitoring and quality control purposes, a service of parallel screens recording is operated. For example, as disclosed in U.S. patent application Ser. No. 17/006,854, filed on Aug. 30, 2020 and incorporated herein by reference.

Existing regulations of Payment Card Industry Data Security Standard (PCI DSS), which is an information security standard for organizations, such as call centers, that handle branded credit cards and Health Insurance Portability and Accountability Act (HIPAA)—United States federal statute enacted by the 104th United States Congress, should be enforced during customer-agent interactions and require to stop the recording of the one or more interactions, to censor sensitive data that is provided by the customer to the agent during the interaction.

However, in a CCaaS that is supporting a blended agents model, e.g., an agent is simultaneously handling multiple interactions via omni channels, when one interaction requires enforcement of compliance regulations, like PCI DSS and HIPAA, such as a voice interaction and the agent triggers a masking command for it, the recording of the agent's actions for this voice interaction and for the screen recording of other active interactions, such as digital interactions, which are taking place at the same time, should be stopped as well.

To support the generation of these abridged videos of all the interactions that took place during the time of one or more masking events, and lack the parts of video when a sensitive information was provided by a customer to the agent and may be shown on the agent's one or more screens that are associated to the computer device of the agent and to prevent issues which may arise in the QM processes during playback of the abridged videos, there is a need for a technical solution that will mark the reason for the censored parts during the recordings in a metadata of the recording file, i.e., video, so that later on a viewer of the played video will be presented with the information as to the parts which were censored.

In other words, there is a need for a technical solution that will include information as to the pause of the screen recording, in a metadata that is related to the abridged video.

To enhance the system's performance, the needed technical solution should include the information, such as the start and end time of the masking, for the different voice and digital interaction channel types, by avoiding synchronization between nodes, e.g., database locks, meaning, by maintaining a lockless architecture.

A technical solution that is implementing an agent based routing algorithm, which creates an agent stickiness to a specific recording control node, and thus avoiding synchronization of the different recording control nodes, may also require database locks, due to database updates, when the same interaction is transferred from one CCaaS agent to another.

Accordingly, there is a need for a system and method for providing real-time lockless parallel screen recording compliance enforcement to omni channel cloud systems, while preserving a lockless architecture to provide robustness and stability to the system.

SUMMARY OF THE INVENTION

There is thus provided, in accordance with some embodiments of the present invention, a computerized method for providing real-time lockless parallel screen recording compliance enforcement to omni channel cloud systems.

Furthermore, in accordance with some embodiments of the present invention, in a processor of a client computer configured to execute code for recording events of one or more voice or digital interactions, on one or more screens associated to the client computer, the computerized method may maintain a cache for storing a masked state. Each interaction may have an associated interaction identifier Furthermore, in accordance with some embodiments of the present invention, upon receiving a screen event from a server of a cloud-based video recording that may communicate with the client computer over a communication network, the computerized method may further operate a compliance-enforcement module.

Furthermore, in accordance with some embodiments of the present invention, the compliance-enforcement module may update the cache and operate a module of recording of screen events for the screen events of the one or more voice or digital interactions.

Thus, by updating in real-time the cache on the client computer refraining from database locks in the server of the cloud-based video recording and enabling real-time lockless parallel screen recording compliance enforcement to omni channel cloud systems.

Furthermore, in accordance with some embodiments of the present invention, when the screen event may be a start recording request to record screen events of an interaction, the compliance-enforcement module may further comprise checking the masked state that is stored in the cache, and when the masked state is positive, the updating of the cache may comprise updating with the associated interaction identifier of the interaction that a recording has started, and it is masked.

Furthermore, in accordance with some embodiments of the present invention, when the mask state is negative, the updating of the cache may comprise updating with the associated interaction identifier of the interaction that a recording has started and the operating of the module of recording of screen events may comprise starting of recording screen events of the interaction.

Furthermore, in accordance with some embodiments of the present invention, when the screen event is a masking request on behalf of a voice interaction, the updating of the cache may comprise updating the masked state in the cache as positive, and the operating of the module of recording of screen events may comprise pausing of recording screen events on the client computer of the interaction and any other interaction.

Furthermore, in accordance with some embodiments of the present invention, when the screen event is an unmasking request on behalf of a voice interaction the updating of the cache may comprise updating the masked state in the cache as negative and the operating the module of recording of screen events may comprise resuming of recording screen events on the client computer of the interaction and any other interaction.

Furthermore, in accordance with some embodiments of the present invention, when the screen event is a stop request on behalf of a voice interaction by its interaction identifier due to an end of the voice interaction, and when the masked state is positive, the operating of the module of recording of screen events may comprise resuming of recording screen events of any other interaction.

And upon receiving an unmasking request from the server the updating of the cache may comprise updating the masked state in the cache as negative Furthermore, in accordance with some embodiments of the present invention, when the screen event is a stop request for a voice interaction or a digital interaction by its interaction identifier and when the mask state is negative: the operating of the module of recording of screen events may comprise stopping of recording screen events for the voice or digital interaction, operating a module to upload the screen recording with related data from the cache to the server of the cloud-based video recording and the updating of the cache comprising deleting the interaction identifier of the voice interaction from the cache.

Furthermore, in accordance with some embodiments of the present invention, the updating of the masked state in the cache as positive further may comprise updating each interaction identifier in a start-pause time of the masking request.

Furthermore, in accordance with some embodiments of the present invention, the updating of the masked state in the cache as negative further may comprise updating each interaction identifier in an end-pause time of the masking request.

Furthermore, in accordance with some embodiments of the present invention, the one or more digital interactions may include at least one of: chat, email, live video and messaging services.

Furthermore, in accordance with some embodiments of the present invention, the related data from the cache may include recording start time, one or more start time and ending time of masking and recording end time.

Furthermore, in accordance with some embodiments of the present invention, when the screen event is a stop request on behalf of a voice interaction by its interaction identifier due to an internal interaction. (such as consultation with other CCaaS agent), and when the masked state is positive, the operating of the module of recording of screen events will not comprise resuming of recording screen events of any interaction.

There is further provided, in accordance with some embodiments of the present invention, a computerized system for providing real-time lockless parallel screen recording compliance enforcement to omni channel cloud systems.

Furthermore, in accordance with some embodiments of the present invention, the computerized system may comprise: a processor of a client computer, a cache for storing a masked state. The cache in maintained by the processor of the client computer and a server of a cloud-based video recording.

Furthermore, in accordance with some embodiments of the present invention, the processor may be configured to execute code for recording events of one or more voice or digital interactions, on one or more screens associated to the client computer, maintaining. Each interaction may have an associated interaction identifier.

Furthermore, in accordance with some embodiments of the present invention, upon receiving a screen event from the server of a cloud-based video recording that is communicating with the client computer over a communication network, the processor may be configured to operate a compliance-enforcement module.

Furthermore, in accordance with some embodiments of the present invention, the compliance-enforcement module may be configured to update the cache and operate a module of recording of screen events for the screen events of the one or more voice or digital interactions.

Thus, by the update in real-time of the cache on the client computer refraining from database locks in the server of the cloud-based video recording and enabling real-time lockless parallel screen recording compliance enforcement to omni channel cloud systems.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing". "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention herein provide a method and system for providing real-time lockless parallel screen recording compliance enforcement to omni channel cloud systems, for example, in a contact center. A supervisor or a Quality Management (QM) process at a remote location may send a request, via a communication network to a computerized device of an agent to start recording events on one or more screens which are associated to the computerized device. The recording of the events may comprise capturing screen events such as audio signals captured by an input device, such as input device 25 in FIG. 1A, audio signals captured through an output device, such as output device 35 in FIG. 1A, videos captured on the screen, and images captured on the screen of the computer device of the agent such as client computer 15 in FIG. 1A.

Figure 2:
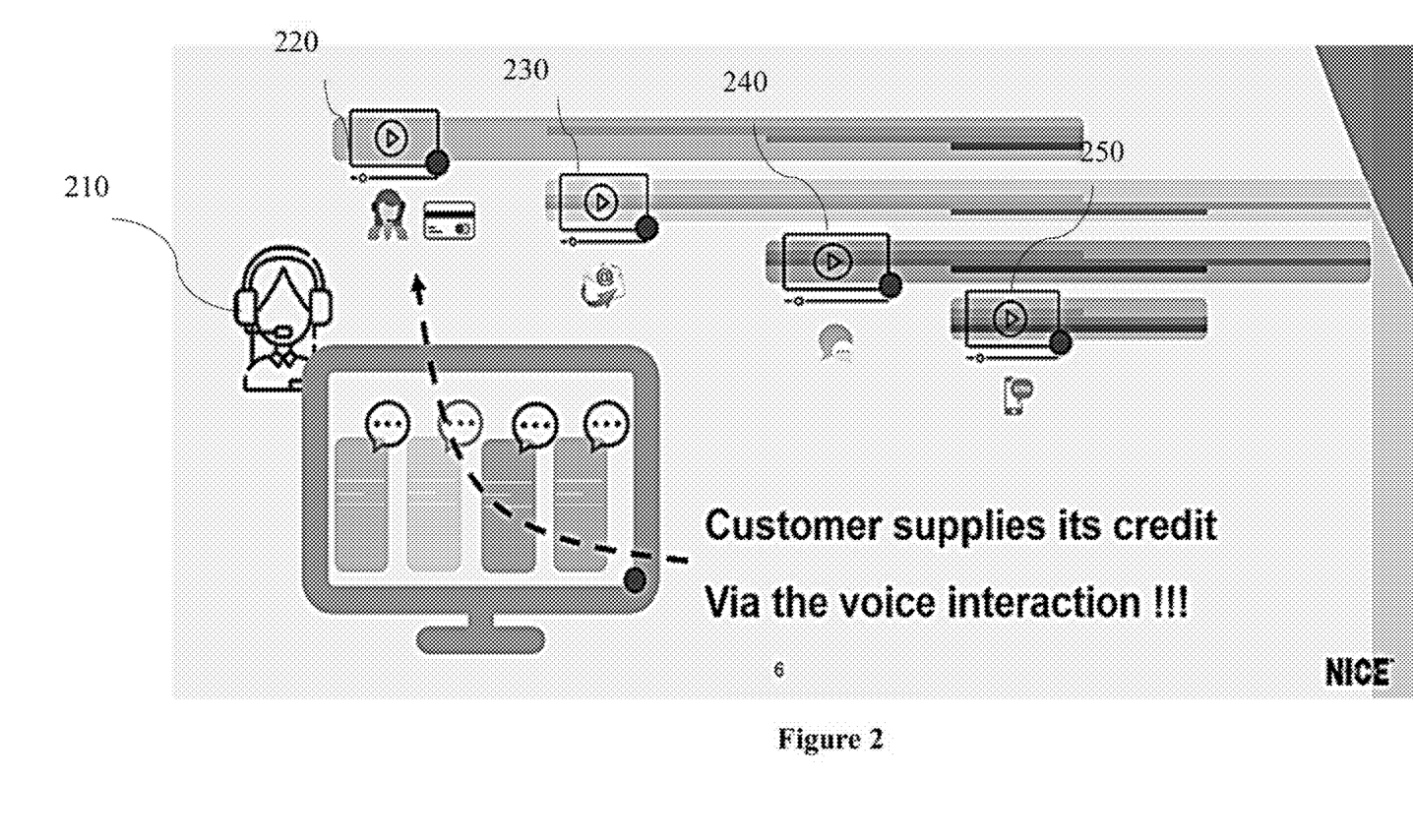
FIG. 2 schematically illustrates a masking of one or more screens recording, in accordance with some embodiments of the present invention.

As part of the Quality Management (QM) process, agent screen recording may be triggered for one or more of the active agent interactions which are visible via the same agent screen or via one or more screens. Meaning, a sensitive data that is provided in one interaction may be captured in each interaction recording, as shown in FIG. 2, and therefor regulation must be enforced on all the recordings of the agent's active interactions.

A recording control, which is a service that is deployed within the cloud, is responsible to receive all the interaction events from the Contact Center as a Service (CCaaS) and to make decisions or requests for other services as to both voice and screen recording. One of the other services, may be a screen recorder which is also a service deployed within the cloud, and responsible to receive screen recording requests from the recording control and pass on the screen recording requests to the computer device of the relevant agent.

A background application, such as a screen agent application, that is running in the background on the computer device of the agent, receives the screen recording request from the screen recording service to start and stop screen recording of the one or more screens, that are associated with the computerized device of the agent. During its operation, the screen agent application may capture data from the one or more screens and then may upload the captured data as media files to an external storage, as disclosed in U.S. patent application Ser. No. 17/006,854, filed on Aug. 30, 2020 and incorporated herein by reference.

Server-side lockless recording control solutions which perform compliance enforcement for non-blended agents, may be implemented by interaction-based routing algorithms. Interaction-based routing algorithms create interaction stickiness to a specific recording control node, and therefore avoiding from synchronizing the different recording control nodes. But since it is for non-blended agents it means that in systems which implement a blended agents model, there will be database (DB) locks.

One of the alternatives of server-side lockless recording control solutions to support the implementation blended agents model, which may handle multiple interactions at the same time, is to upgrade the algorithm from interaction-based routing to agent-based routing that will create agent stickiness to a specific recording control node, and therefore avoid the need to synchronize the different recording control nodes. However, the same interaction may be transferred from one CCaaS agent to another, hence the agent-based routing will not be database locks free.

Since current CCaaSs are often operating in a blended agent model for QM purposes, a service of parallel screens recording is operated during simultaneously handled interactions by the agent. The enforcement of existing regulations of Payment Card Industry Data Security Standard (PCI DSS) and Health Insurance Portability and Accountability Act (HIPAA) may require stopping the recording of audio and video of one of the interactions that the agent is handling, due to sensitive data disclosure.

For example, in case a customer provides, during a voice interaction, sensitive information, such as a credit card number and the agent documents it into one of the applications, such as Customer Relationship Management (CRM), that is associated to the agent's computer device, the PCI DSS and HIPAA regulations requirements are to stop both audio and screen recordings, during that time.

However, in a CCaaS that is implementing a blended agents model, when one interaction requires enforcement of compliance regulations, the ramifications of stopping the service of the parallel screens recording are stopping the recording of the agent's actions, for the other active interactions, which are taking place at the same time and are not disclosing sensitive information. The consequences of stopping the recordings of the simultaneously handled other active interactions, may be abridged videos of the interactions.

During quality control of these interactions, these abridged videos should be played in a way that specifies that a mask event has started with the relevant time and when an unmasking event has ended the masking event.

Therefore, there is a need for providing real-time lockless parallel screen recording compliance enforcement to omni channel cloud systems.

The term "computer device" as used herein refers to any device that is used by a user to conduct an interaction with a customer. The computer device may be a desktop device, a handheld device and a laptop.

The term "screen event" as used herein refers to audio signals captured by an input device or through an output device, videos captured on the screen, and images captured on the screen of the computer device of the agent.

In the context of the present disclosure, the term "screen events" may refer to audio signals captured by an input device at the agent's computerized device, such as the agent's voice captured with a microphone, audio signals captured by an output device, such as the customer voice that may be captured from an input device, such as heard by the agent in a headphone or external speaker while interacting with the agent, videos on the screen that the agent is viewing, and/or still images on the screen that the agent is viewing. The agent may be interacting with another person, such as a customer, via regular phone call and/or video call agents and/or applications operating on the agent's computerized device (e.g., client computer). These captured interactions may also be screen events in the context of the present disclosure.

Figure 1A:
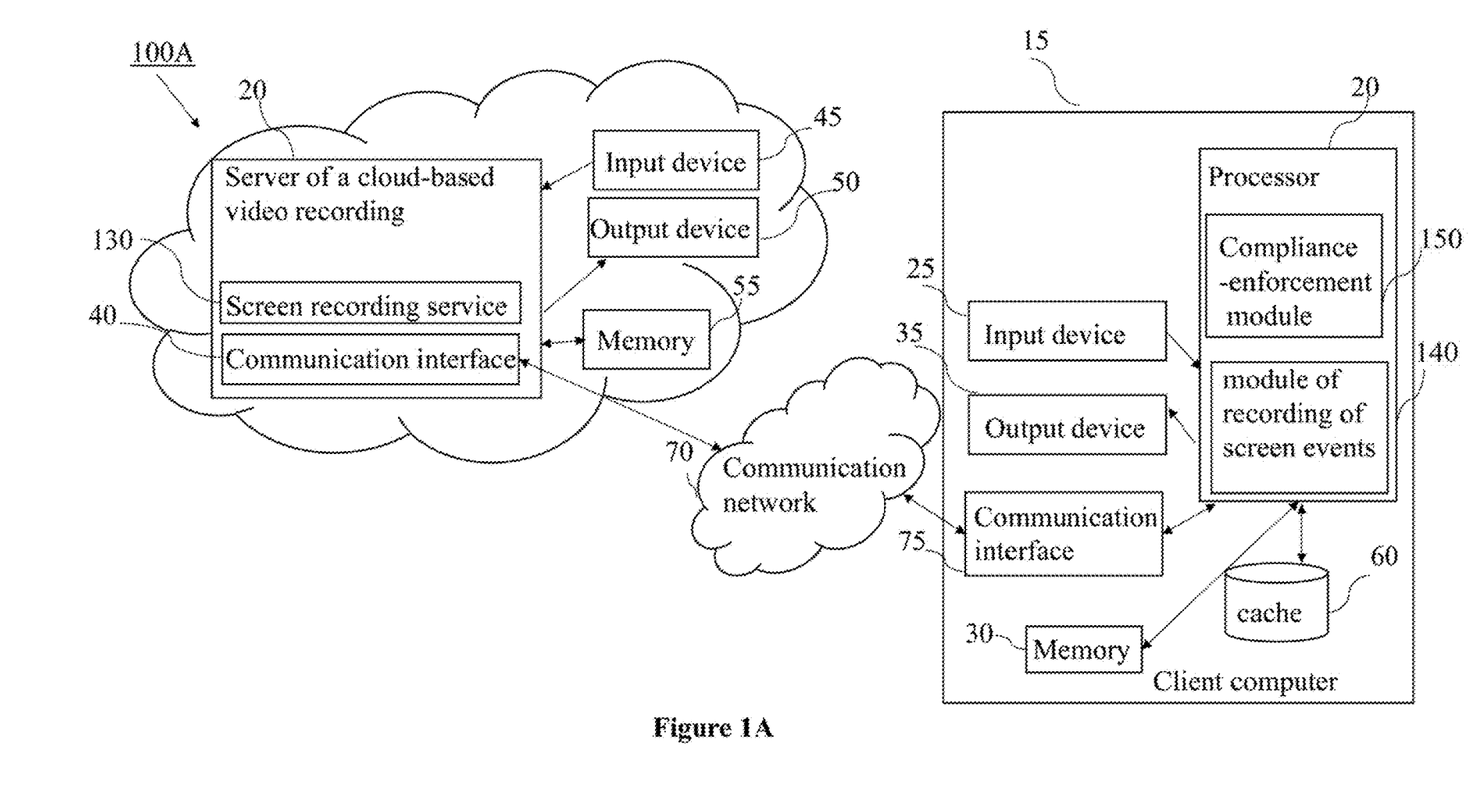
FIG. 1A schematically illustrates a block diagram of a system for providing real-tune lockless parallel screen recording compliance enforcement to omni channel cloud systems, in accordance with some embodiments of the present invention.

FIG. 1 schematically illustrates a block diagram of a system 100A for providing real-time lockless parallel screen recording compliance enforcement to omni channel cloud systems, in accordance with some embodiments of the present invention.

According to some embodiments of the present disclosure, a system for providing real-time lockless parallel screen recording compliance enforcement to omni channel cloud systems, such as system 100A, may include one or more client computers 15 (e.g., at least one client computer) communicating with a server 20 via a communication network 70. Each client computer 15 may include a processor 20 coupled to a memory 30, a cache 60, an input device 25, an output device 35, and communication interface circuitry 75 for communicating with communication network 70. Similarly, server 20 may include a server processor (not shown) coupled to a memory 55, a storage device (not shown), an input device 45, an output device 50, and a communication interface circuitry 40 for communicating with communication network 70.

Figure 1B:
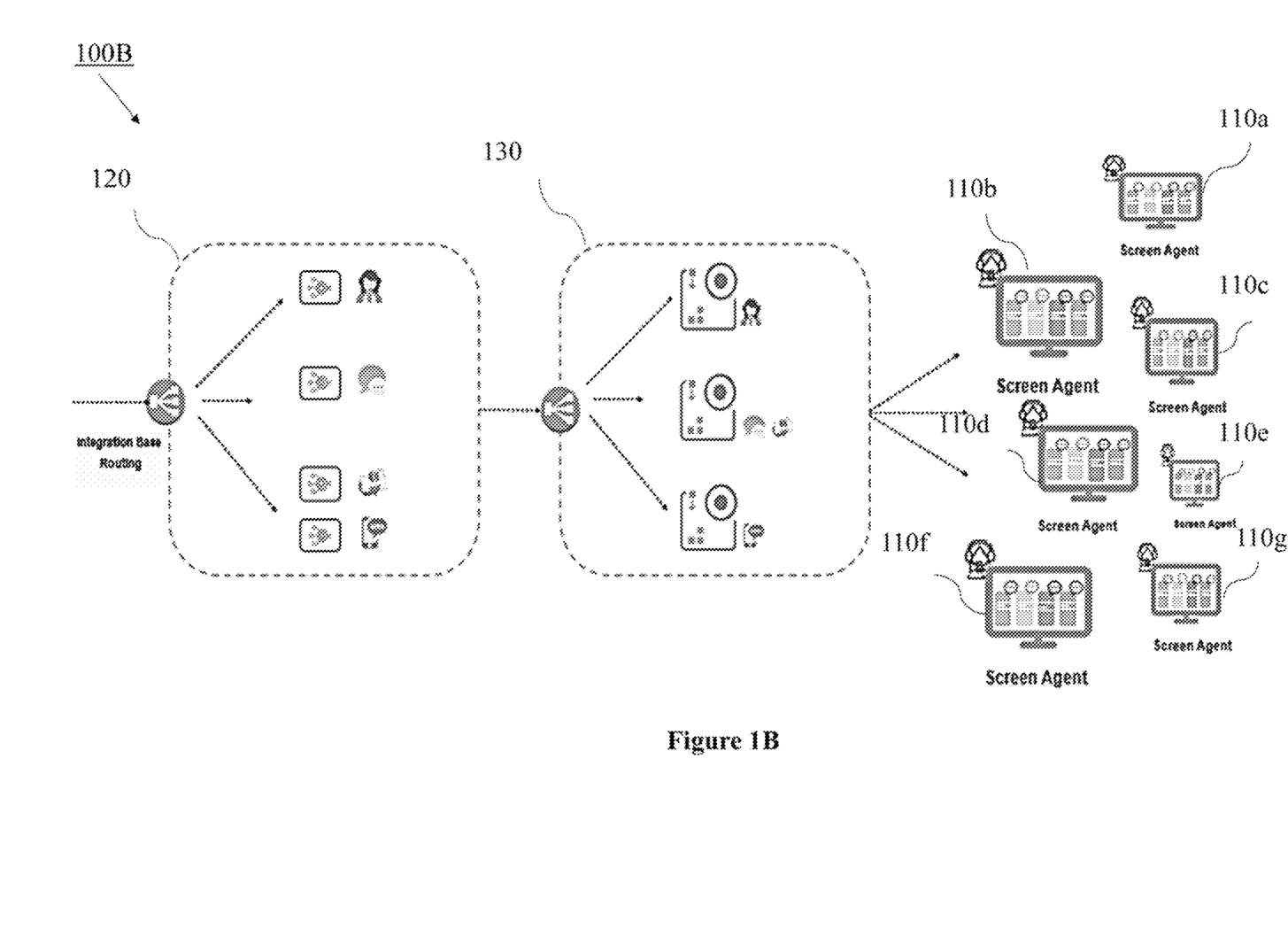
FIG. 1B schematically illustrates a block diagram of a system for providing real-time lockless parallel screen recording compliance enforcement to omni channel cloud systems, in accordance with some embodiments of the present invention.

According to some embodiments of the present disclosure, in a cloud-based environment upon receiving a screen event from an Automatic Call Distribution (ACD) (not shown) which is a skills-based omni-channel routing engine that connects customers to the most suited agents, a recording control service, such as recording control service 120 in FIG. 1B on a server of a cloud based recording, such as server of a cloud based recording 20, may decide which interaction should be recorded according to a preconfigured set of rules. The interaction may be between a customer and an agent and also an internal interaction between the agent and a supervisor or a colleague.

According to some embodiments of the present disclosure, the recording control service, such as recording control service 120 in FIG. 1B may be a scalable stateless service that may receive a stream of interactions of different media types such as voice, chat, email and messaging services.

According to some embodiments of the present disclosure, in case recording of an interaction is required according to the preconfigured set of rules, the recording control service, such as recording control service 120 in FIG. 1B may send a screen recording request to a screen recording service, such as screen recording service 130 that may be running on the server, such as the server of a cloud-based video recording 20 or any other one or more servers that may be communicating with the server via a communication network.

According to some embodiments of the present disclosure, the screen recording service, such as screen recording service 130 may be a scalable stateless service that may receive screen recording requests from the recording control service, such as recording control service 120 in FIG. 1B, per the different contact center agents. The screen recording service, such as screen recording service 130 may send the screen recording request to the relevant screen agent client, such as module of recording of screen events 140.

According to some embodiments of the present disclosure, the screen agent client, such as module of recording of screen events 140 may be a background application that runs on the client computer, such as client computer 15. This application may capture the desktop screen and upload the captured data as media files to external storage. The screen agent client application, such as module of recording of screen events 140, may receive requests for start and stop screen recording from the screen recording service, such as screen recording service 130 that is running on a server, such as server of a cloud-based video recording 20.

According to some embodiments of the present disclosure, the client computer, such as client computer 15 may be an agent's desktop, a mobile device, a laptop or any other computer device.

According to some embodiments of the present disclosure, the processor on the client computer, such as processor 20 and server processor (not shown) may include one or more processing units, e.g. of one or more computers. Processors 20 and the server processor may be configured to operate in accordance with programmed instructions stored in memories 30 and 55 and/or the cache on the client computer, such as cache 60 and a storage device (not shown) that may be associated to the server. Client processor 20 may be capable of executing a screen agent client application, such as module of recording of screen events 140 for recording events at the one or more screens associated to the client computer 15, at a contact center.

According to some embodiments of the present disclosure, the server processor (not shown) may be capable of executing the recording control service, such as recording control service 120 in FIG. 1B, the screen recording service, such as screen recording service 130 and along with the processor 20 of the client computer 15 which may be capable of executing the screen agent client application, such as module of recording of screen events 140 may provide real-time lockless parallel screen recording compliance enforcement to omni channel cloud systems for each of client computers 15 as well as implementing serverless computing services for implementing these services.

According to some embodiments of the present disclosure, the client processor 20 may communicate with output device 35. For example, output device 35 may include a computer monitor or screen on which screen agent client application, such as module of recording of screen events 140 may capture the screen events on one or more screens associated to the client computer 15 and record them into one or more video files. Output device 35 may include a printer, display panel, speaker, or another device capable of producing visible, audible, or tactile output.

According to some embodiments of the present disclosure, the server processor (not shown) may communicate with a screen of output device 50 to display a graphic user interfaces for configuring the set of rules of the recording control service, such as recording control service 120 in FIG. 1B for the user of system 100A. Output device 50 may include a printer, display panel, speaker, or another device capable of producing visible, audible, or tactile output.

According to some embodiments of the present disclosure, processor 20 may communicate with input device 25. For example, input device 25 may include one or more keyboards, keypads, or pointing devices for enabling a user to input data or instructions for the operation of processor 20, which may be captured as screen events. Input device 25 may also include a microphone capturing the audio signals of a voice of the client computer user (e.g., an agent's voice during a customer call), which may be also included in the captured screen events.

According to some embodiments of the present disclosure, server processor (not shown) may communicate with server input device 45. For example, server input device 45 may include one or more of keyboards keypads or pointing devices for enabling a user of system 100A for inputting data or instructions for operation of the processor (not shown).

According to some embodiments of the present disclosure, memories 30 and 55 may each include one or more volatile or nonvolatile memory devices. Memories 30 and 55 may be utilized to store, for example, programmed instructions for operation of processors 20 and the server processor (not shown), respectively, data or parameters for use by processors 20 and server processor (not shown) during operation, or results of operations of processors 20 and server processor (not shown).

According to some embodiments of the present disclosure, in operation, processors 20 and the server processor (not shown) may execute a computerized method for providing real-time lockless parallel screen recording compliance enforcement to omni channel cloud systems on one or more client computer 15 using a cloud serverless architecture implemented on server 20.

Figure 3A:
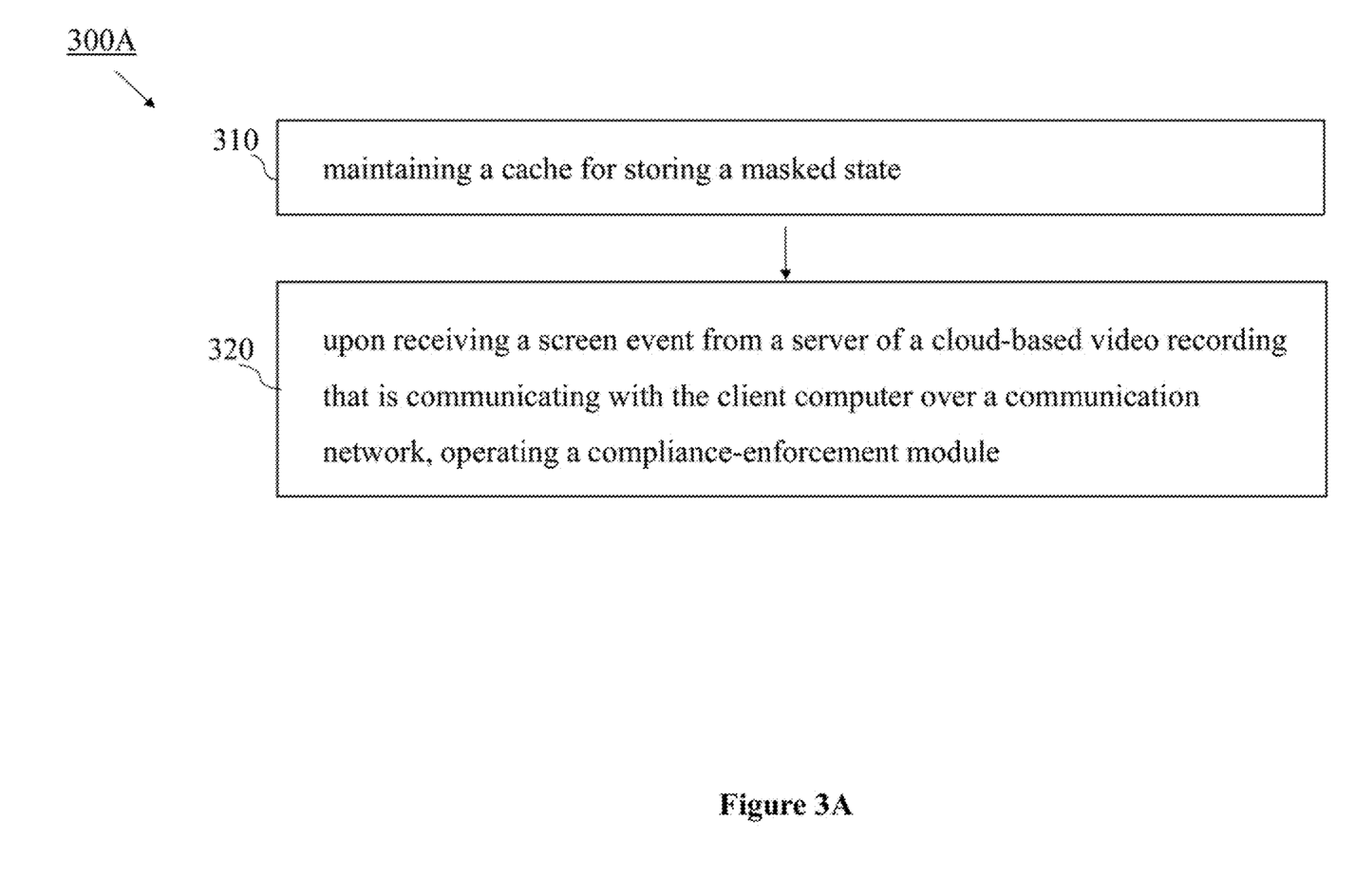
FIG. 3A schematically illustrates a flow diagram of a computerized method for providing real-time lockless parallel screen recording compliance enforcement to omni channel cloud systems, in accordance with some embodiments of the present invention.

According to some embodiments of the present disclosure, system 100A may implement a computerized-method such as computerized method 300A for providing real-time lockless parallel screen recording compliance enforcement to omni channel cloud systems, in accordance with some embodiments of the present invention.

FIG. 1B schematically illustrates a block diagram of a system 100B for providing real-time lockless parallel screen recording compliance enforcement to omni channel cloud systems, in accordance with some embodiments of the present invention.

According to some embodiments of the present disclosure, a system for providing real-time lockless parallel screen recording compliance enforcement to omni channel cloud systems, such as system 100B, may receive a voice or a digital event from an Automatic Call Distribution (ACD) (not shown) which is a skills-based omni-channel routing engine to connect incoming interactions to agents. The ACD may simultaneously forward multiple voice and digital interactions to the computer device of the agent, such as client computer 15 in FIG. 1A. The ACD may also receive requests which were triggered by the agent via an input device that may be associated to the agent's computer device.

For example, upon the agent's handling of sensitive information of the customer during an interaction, the agent may be obliged by the regulations, to mask the sensitive information. In another example, the agent may pause the interaction to consult with another colleague or supervisor via an internal interaction. In yet another example, the agent may trigger an unmasked request from the agent's computer device when masking is no longer needed.

According to some embodiments of the present disclosure, requests which were triggered from the agent's device may be received by the ACD (not shown) and may be forwarded to a recording control service, such as recording control service 120 in FIG. 1B on a server of a cloud based recording, such as server of a cloud based recording 20 in FIG. 1. Based on a preconfigured set of rules, the recording control service, such as recording control service 120 in FIG. 1B may decide to forward the received request to a screen recording service, such as screen recording service 130, that may be running on the server, such as the server of a cloud-based video recording 20 in FIG. 1A or any other one or more servers that may be communicating with the server via a communication network.

According to some embodiments of the present disclosure, after the screen recording service, such as screen recording service 130 has received a request from recording control service, such as recording control service 120 in FIG. 1B, the screen recording service, such as screen recording service 130 may communicate via a communication interface, such as communication interface 40 in FIG. 1A through communication network 70 with the communication interface 75 of the client computer 15 in FIG. 1A. The communication from the screen recording service, such as screen recording service 130 may be received by a module, such as the module of recording of screen events 140 in FIG. 1A, via communication interface 75 in FIG. 1A, that is running on the client computer 15 in FIG. 1A.

According to some embodiments of the present disclosure, in case recording of an interaction is required according to the preconfigured set of rules associated with the recording control service, such as recording control service 120 in FIG. 1B, may send a screen recording request to a screen recording service, such as screen recording service 130. The screen recording service, such as screen recording service 130, may send a request to the screen recording of the relevant screen agent client, such as module of recording of screen events 140, that is running on the agent's client computer 15 in FIG. 1A. For example, to record screen events on the one or more screens 110a-110g which are associated to the agent's computer device such as client computer 15 in FIG. 1A.

According to some embodiments of the present disclosure, the screen events may be screen events of one or more voice or digital interactions which are handled simultaneously and displayed on one or more screens 110a-110g which are associated with the computer device of the agent, e.g. client computer 15 in FIG. 1A.

Figure 3B:
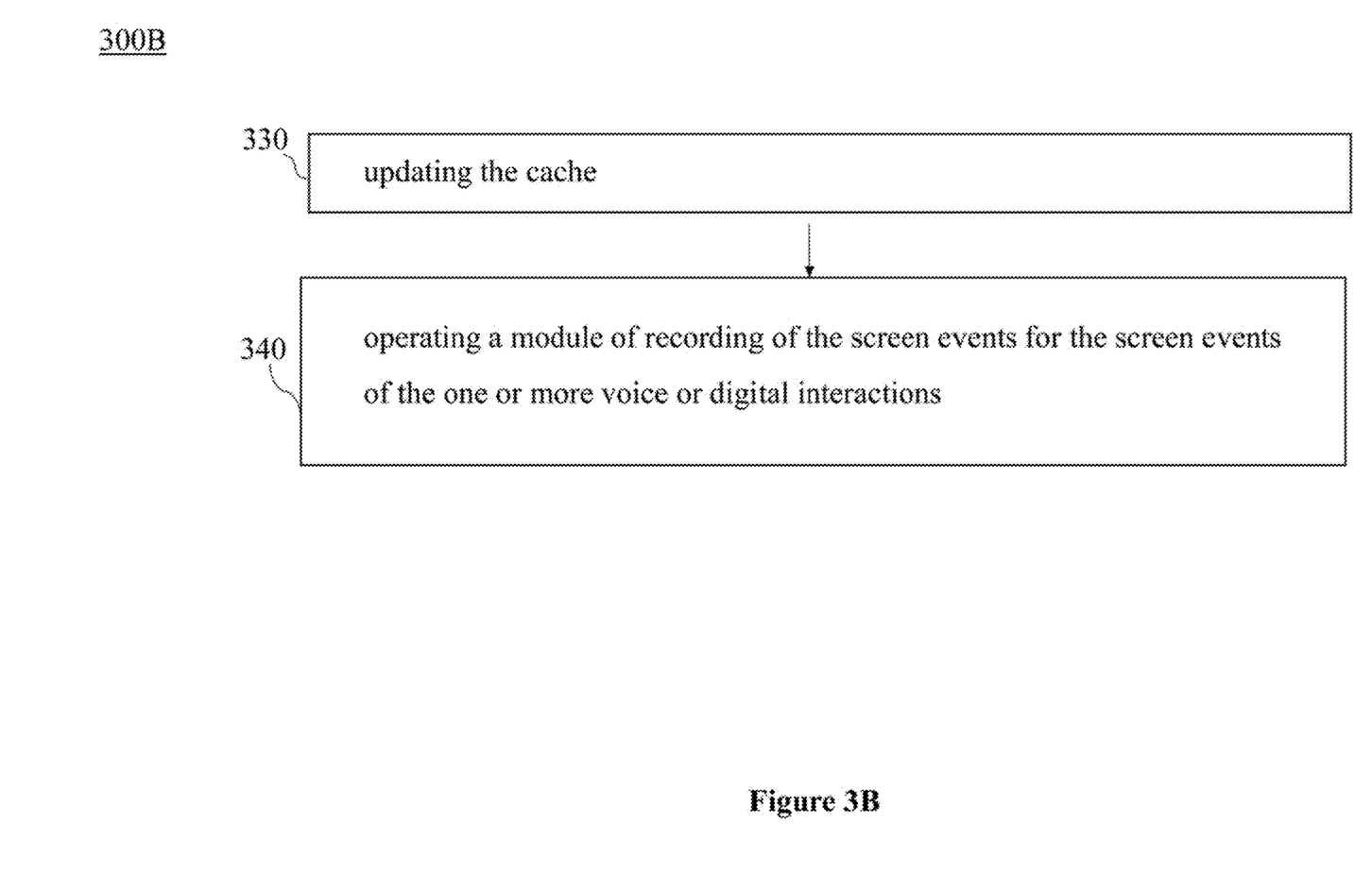
FIG. 3B schematically illustrates a flow diagram of a compliance-enforcement module, in accordance with some embodiments of the present invention.

According to some embodiments of the present disclosure, upon receiving a screen event from a server, such as a server of a cloud-based video recording 20 in FIG. 1A, that is communicating with the client computer 15 in FIG. 1A, over a communication network 70 in FIG. 1A, system 100B may operate a compliance-enforcement module, such as compliance-enforcement module 150 and such as compliance-enforcement module 300B in FIG. 3B.

According to some embodiments of the present disclosure, the compliance-enforcement module, such as compliance-enforcement module 150 and such as compliance-enforcement module 300B in FIG. 3B, may update a cache, such as cache 60 in FIG. 1A and may operate a module of recording of screen events, such as the module of screen events 140 in FIG. 1A, for the screen events, of the one or more voice or digital interactions.

According to some embodiments of the present disclosure, by updating in real-time the cache, such as cache 60 in FIG. 1A, on the client computer with screen recording details, system 100B is refraining from database locks in the server of the cloud-based video recording, such as a server of a cloud-based video recording 20 in FIG. 1A and enabling real-time lockless parallel screen recording compliance enforcement to omni channel cloud systems.

Figure 4A:
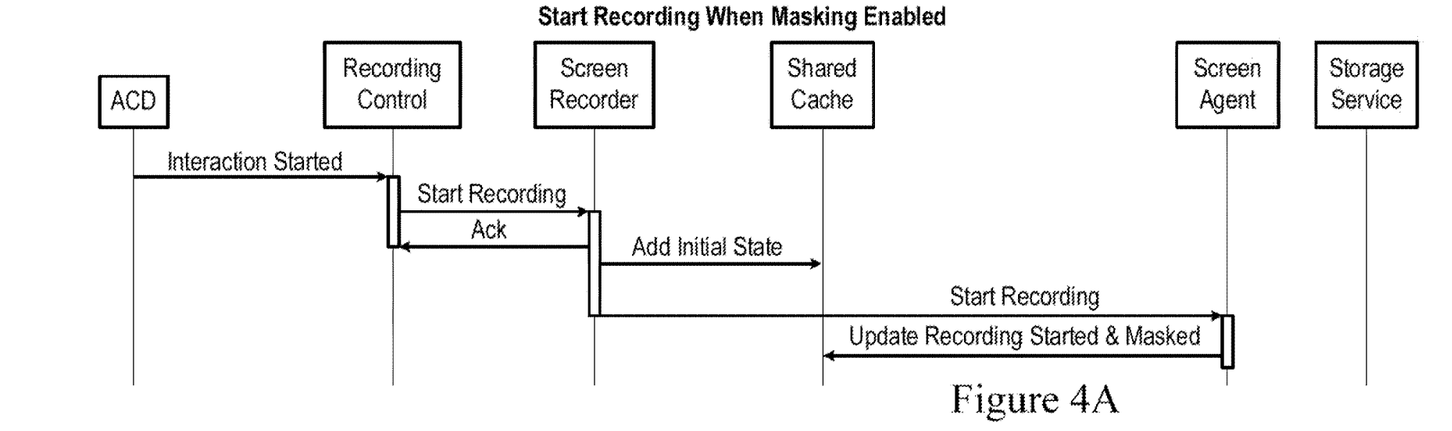
FIGS. 4A-4F schematically illustrate flow diagrams of computerized method for providing real-time lockless parallel screen recording compliance enforcement to omni channel cloud systems for different screen events, in accordance with some embodiments of the present invention.

According to some embodiments of the present disclosure, the screen event may be a start recording request to record screen events of an interaction. When a screen event such as a start recording request is received by a module, such as the module of screen events 140 in FIG. 1A, the compliance-enforcement module such as compliance-enforcement module 150 and such as compliance-enforcement module 300B in FIG. 3B may check the masked state that is stored in the cache, such as cache 60 in FIG. 1A and when the masked state is positive, the cache 60 in FIG. 1A, may be updated with the associated interaction identifier of the interaction that a recording has started, and it is masked, as shown in FIG. 4A.

Figure 4B:
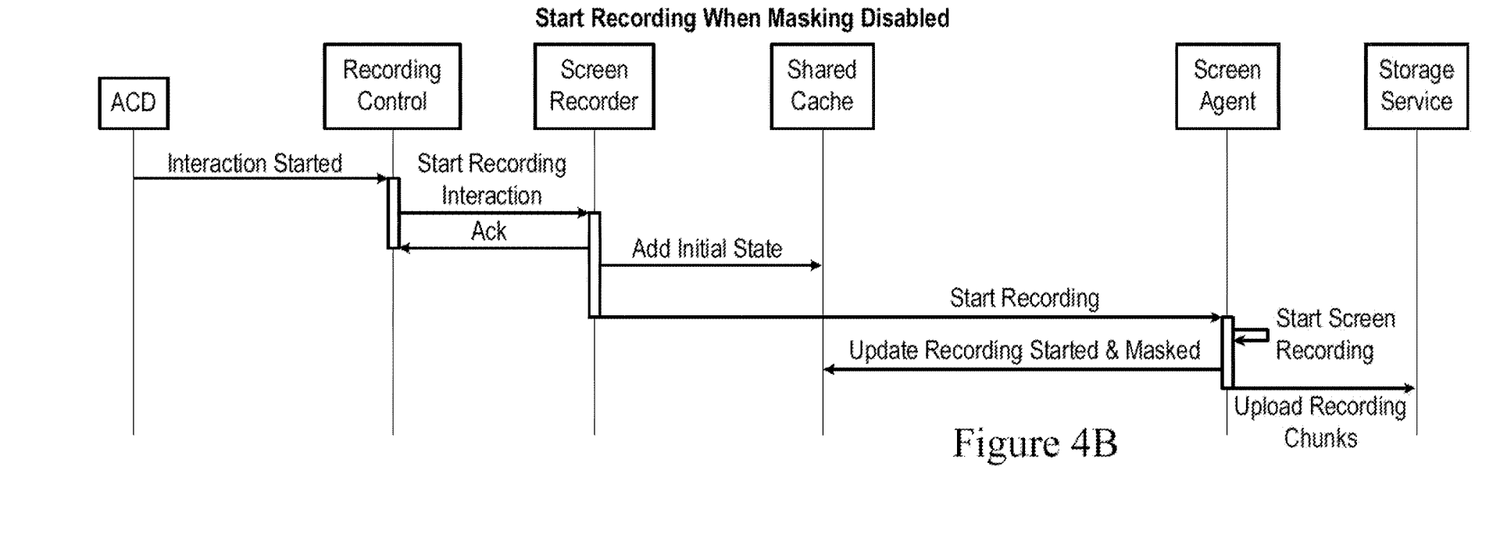

According to some embodiments of the present disclosure, when the screen event, such as a start recording request is received by a module, such as the module of screen events in FIG. 1A, and when the mask state is negative, the cache 60 in FIG. 1A may be updated with the associated interaction identifier of the interaction that a recording has started and a module, such as the module of recording of screen events 140 may be operated to start the recording of screen events of the interaction, as shown in FIG. 4B.

Figure 4C:
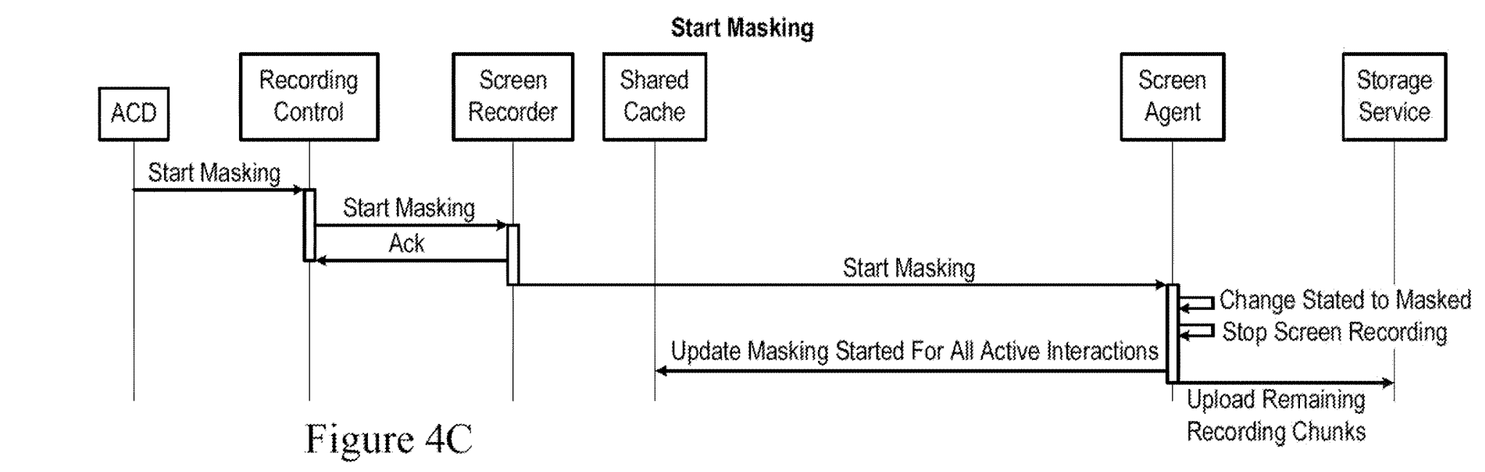

According to some embodiments of the present disclosure, when the screen event is a masking request on behalf of a voice interaction, due to sensitive information handling by the agent, system 100B may operate a compliance-enforcement module, such as compliance-enforcement module 150 and such as compliance-enforcement module 300B in FIG. 3B, to update the cache, such as cache 60 in FIG. 1A, with a masked state as positive, and operate the module of recording of screen events 140 to pause the recording of screen events for the interaction and any other interaction that is conducted via the agent computer device, as shown in FIG. 4C.

Figure 4D:
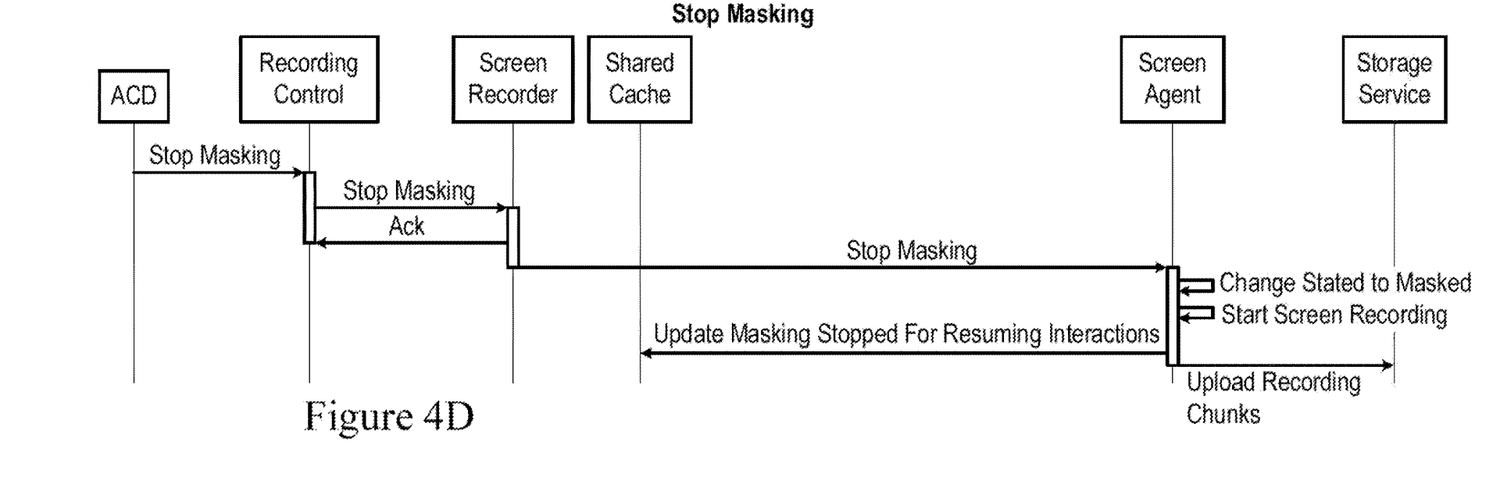

According to some embodiments of the present disclosure, when the screen event is an unmasking request on behalf of a voice interaction system 100B may operate a compliance-enforcement module, such as compliance-enforcement module 150 and such as compliance-enforcement module 300B in FIG. 3B, to update the cache, such as cache 60 in FIG. 1A, with a masked state as negative and operate the module of recording of screen events 140 to resume the recording of screen events for the interaction, as shown in FIG. 4D.

According to some embodiments of the present disclosure, when the screen event is a stop request, on behalf of a voice interaction, by its interaction identifier due to an end of the voice interaction, and when the masked state, in the cache, is positive, system 100B may operate a compliance-enforcement module, such as compliance-enforcement module 150 and such as compliance-enforcement module 300B in FIG. 3B, to operate the module of recording of screen events 140 to resume the recording of screen events for any other interaction. Upon receiving an unmasking request from the server, the module 300B in FIG. 3B may update the masked state in the cache as negative as shown in FIG. 4F.

Figure 4E:
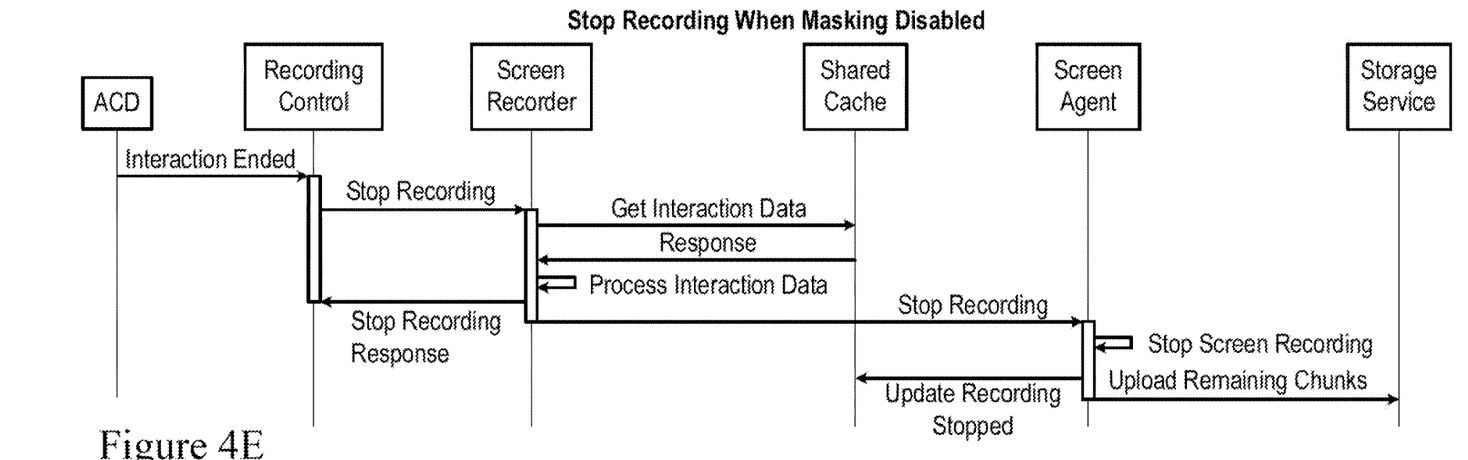
Figure 4F:
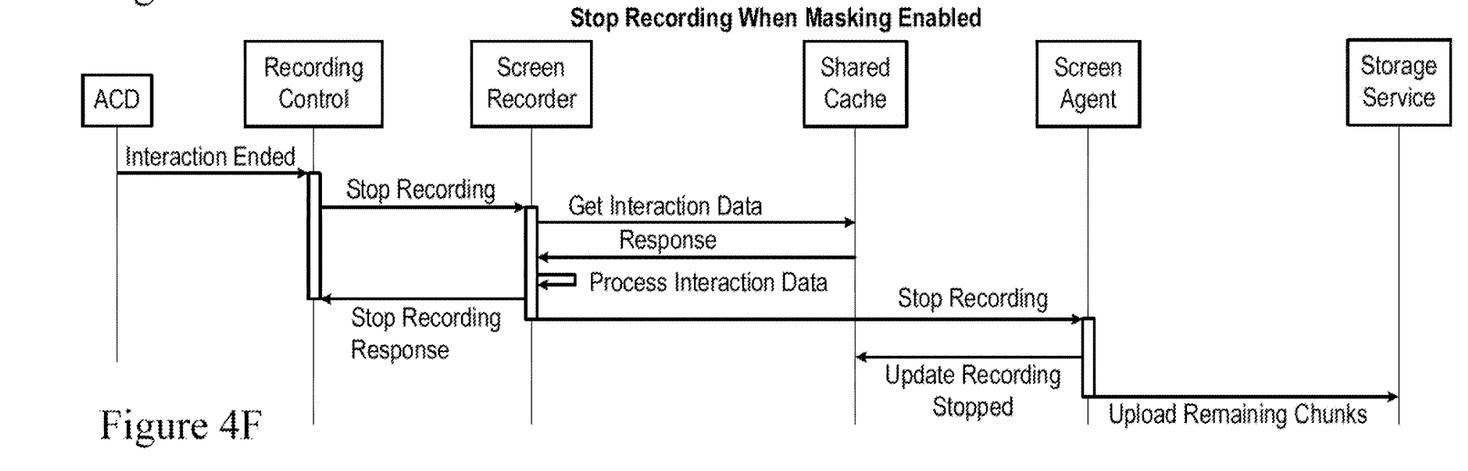

According to some embodiments of the present disclosure, when the screen event is a stop request for a voice interaction or a digital interaction by its interaction identifier and when the mask state is negative, system 100B may operate a compliance-enforcement module, such as compliance-enforcement module 150 and such as compliance-enforcement module 300B in FIG. 3B, to operate the module of recording of screen events 140 to stop the recording of screen events for the voice or digital interaction, and operate a module to upload the screen recording with related data from the cache, such as cache 60 in FIG. 1A to the server of the cloud-based video recording 20 in FIG. 1A, and to update the cache 60 in FIG. 1A by deleting the interaction identifier of the voice interaction from the cache 60 in FIG. 1A, as shown in FIG. 4E.

According to some embodiments of the present disclosure, the updating of the masked state in the cache 60 in FIG. 1A, as positive, may further include updating each interaction identifier in a start-pause time of the masking request.

According to some embodiments of the present disclosure, the updating of the masked state in the cache 60 in FIG. 1A, as negative may further include updating each interaction identifier in an end-pause time of the masking request.

Figure 5:
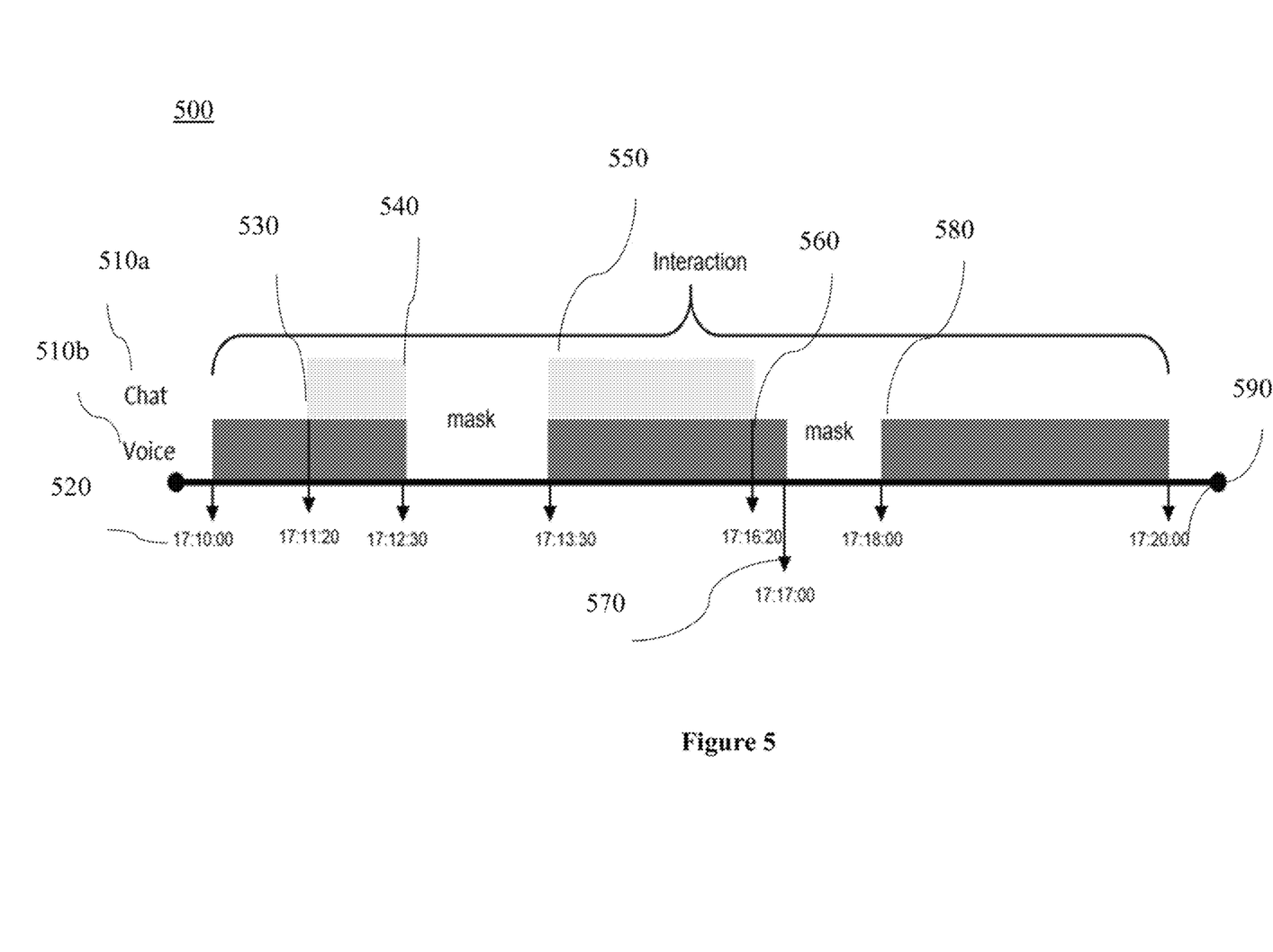
FIG. 5 schematically illustrates an example of data that is accumulated in a cache for two simultaneous interactions, in accordance with some embodiments of the present invention.

According to some embodiments of the present disclosure, related data from the cache 60 in FIG. 1A, may include recording start time, one or more start time and ending time of masking and recording end time, as shown in example 500 in FIG. 5.

According to some embodiments of the present disclosure, when the screen event is a stop request on behalf of a voice interaction by its interaction identifier due to an internal interaction, and when the masked state is positive, the operating of the module of recording of screen events 140 will not comprise resuming of recording screen events of any interaction.

According to some embodiments of the present disclosure, system 100B may implement a computerized-method such as computerized method 300A for providing real-time lockless parallel screen recording compliance enforcement to omni channel cloud systems, in accordance with some embodiments of the present invention.

The system 100A and 100B shown in FIGS. 1A-1B may handle a complexity of $nPr = n!/(n-r)!$ scenarios in real-time and without any database locks in order to enforce regulations by taking pause recording and resume recording decisions, for all the active agent's screen recordings.

Whereby X is the max concurrency for the agent's Active Interactions, Y is the number of event types (e.g. connect, mask, hold, . . . ), N is the number of events alternatives. For example. Connect(Interaction 1). Connect(Interaction 2), . . . Connect(Interaction X), mask (Interaction 1), mask (Interaction 2), . . . event Y (Interaction X), . . . event Y (Interaction 1), event Y (Interaction 2), . . . event Y (Interaction X), . . . R is the reasonable events count in an events race condition.

Accordingly, the compliance-enforcement module compliance-enforcement module 150 and such as compliance-enforcement module 300B in FIG. 3B which is a lockless recording control algorithm is not limited by any active agent interaction count while preserving high system performance, simplicity and reliability.

FIG. 2 schematically illustrates a masking of one or more screens recording, in accordance with some embodiments of the present invention.

According to some embodiments of the present disclosure, an agent, such as agent 210, may simultaneously handle multiple interactions via different channel types, such as voice interaction 220, email interaction 230, chat interaction 240 and text messaging interaction 250. In a non-limiting example, when sensitive data, such as credit card details, may be provided by the customer via the voice interaction 220, and the agent intends to enter the information to the one or more applications, such as Customer Relationship Management (CRM), the agent 210 may be obliged to trigger a mask command via the computer device, such as client computer 15, in FIG. 1A.

According to some embodiments of the present disclosure, the mask command may be received in the ACD and accordingly a screen event may be sent to a recording control service, such as recording control service 120 in FIG. 1B on a server of a cloud based recording, such as server of a cloud based recording 20. The recording control service 120 in FIG. 1B may forward the masking request to a screen recording service, such as screen recording service 130 in FIG. 1A and such as screen recording service 130 in FIG. 1B.

According to some embodiments of the present disclosure, the screen recording service, such as screen recording service 130 in FIG. 1A and such as screen recording service 130 in FIG. 1B, may communicate via a communication interface, such as communication interface 40 in FIG. 1A, via a communication network 70 and a communication interface 75 in FIG. 1A to send a masking request to a module, such as compliance-enforcement module 150 and such as compliance-enforcement module 300B in FIG. 3B.

According to some embodiments of the present disclosure, when the compliance-enforcement module, such as compliance-enforcement module 150 and such as compliance-enforcement module 300B in FIG. 3B, may receive a screen event, such as a masking request, the compliance-enforcement module 300B in FIG. 3B, may update the cache, such as cache 60 in FIG. 1A, with the masked state in the cache as positive, and also may operate the module of recording of screen events 140 in FIG. 1A to pause the recording of the screen events of the interaction and any other active interactions which are conducted via the agent computer device, such as client computer 15 in FIG. 1A.

FIG. 3A schematically illustrate a flow diagram of a computerized method 300A for providing real-time lockless parallel screen recording compliance enforcement to omni channel cloud systems, in accordance with some embodiments of the present invention.

According to some embodiments of the present disclosure, operation 310 may comprise maintaining a cache for storing a masked state. The cache may be maintained on the computer device of the agent, such as client computer 15 in FIG. 1A.

According to some embodiments of the present disclosure, operation 310 may comprise upon receiving a screen event from a server of a cloud-based video recording that is communicating with the client computer over a communication network, operating a compliance-enforcement module. The compliance-enforcement module may be a compliance-enforcement module such as compliance-enforcement module 150 and such as compliance-enforcement module 300B, as described in detail below.

FIG. 3B schematically illustrate a flow diagram of a compliance-enforcement module 300B, in accordance with some embodiments of the present invention.

According to some embodiments of the present disclosure, operation 330 may comprise updating the cache. The cache may be a cache such as cache 60 in FIG. 1A.

According to some embodiments of the present disclosure, operation 330 may comprise operating a module of recording of the screen events for the screen events of the one or more voice or digital interactions.

FIG. 5 schematically illustrates an example 500 of data that is accumulated in a cache for two simultaneous interactions, in accordance with some embodiments of the present invention.

According to some embodiments of the present disclosure, a cache, such as cache 60 in FIG. 1A, that may be maintained on the agent's computer device, such as client computer or associated thereto, may include recording start time, one or more start time and ending time of masking and recording end time which are associated with the interactions.

For example, the interactions may be chat interaction 510a and voice interaction 510b, which are conducted simultaneously by an agent, via the computer device. The cache, such as cache 60 in FIG. 1A, may be updated in response to requests which are received from the recording control service, such as recording control service 120 in FIG. 1B. The update of the cache may be operated by a module, such as compliance-enforcement module, that is running on the computer device of the agent.

According to some embodiments of the present disclosure, a voice interaction 510b may start at 17:10:00 520 and at 17:11:20 530 a chat interaction 510a may start while the voice interaction 510b continues. At 17:12:30 540, due to sensitive data that is provided by the customer, to comply with regulations, the agent may trigger from the computer device, such as client computer 15 in FIG. 1A a masking command.

According to some embodiments of the present disclosure, when the screen event is a masking request on behalf of a voice interaction, the cache, such as cache 60 in FIG. 1A may be updated with a masked state as positive, and the operating of a module, such as the module of recording of screen events 140 in FIG. 1A may pause the recording of the screen events on the one or more screen which are associated to the computer device, such as client computer 15 in FIG. 1A. Therefore, the recording of all interactions, 510a and 510b are paused.

According to some embodiments of the present disclosure, at 17:13:30 550 when the agent triggers an unmasking command because the customer has finished providing sensitive data, meaning, when the screen event is an unmasking request on behalf of a voice interaction, the cache, such as cache 60 in FIG. 1A, may be updated with a masked state as negative and the operating of a module, such as the module of recording of screen events 140 in FIG. 1A may resume the recording of the screen events on the one or more screen which are associated to the computer device, such as client computer 15 in FIG. 1A.

According to some embodiments of the present disclosure, the chat interaction 510*a* may end at 17:16:20 560 and at 17:17:00 570 the agent may trigger again a masking command, when the screen event is a masking request on behalf of a voice interaction, the cache, such as cache 60 in FIG. 1A may be updated with a masked state as positive, and the operating of a module, such as the module of recording of screen events 140 in FIG. 1A may pause the recording of the screen events on the one or more screen which are associated to the computer device, such as client computer 15 in FIG. 1A. Therefore, the recording of the voice interaction 510*a* may be paused.

According to some embodiments of the present disclosure, at 17:18:00 580 when the agent triggers an unmasking command because the customer has finished providing sensitive data, meaning, when the screen event is an unmasking request on behalf of a voice interaction, the cache, such as cache 60 in FIG. 1A, may be updated with a masked state as negative and the operating of a module, such as the module of recording of screen events 140 in FIG. 1A may resume the recording of the screen events on the one or more screen which are associated to the computer device, such as client computer 15 in FIG. 1A.

According to some embodiments of the present disclosure, at 17:20:00 590 the voice interaction 510*b* may end, when the screen event is a stop request for a voice interaction by its interaction identifier and when the mask state is negative the operating of a module, such as the module of recording of screen events 140 may stop the recording of the screen events for the voice or digital interaction that ended. Then, a module to upload the screen recording with related data from the cache to the server of the cloud-based video recording may be operated on the cache, such as cache 60 in FIG. 1A may be updated by deleting the interaction identifier of the voice interaction from the cache.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed:

1. A computerized method for providing real-time lockless parallel screen recording compliance enforcement to omni channel cloud systems, the computerized method comprising:

in a processor of a client computer configured to execute code for recording events of one or more voice or digital interactions, on one or more screens associated to the client computer, maintaining a cache for storing a masked state, and upon receiving a screen event from a server of a cloud-based video recording that is communicating with the client computer over a communication network, operating a compliance-enforcement module, said compliance-enforcement module comprising:

updating the cache; and operating a module of recording of screen events for the screen events of the one or more voice or digital interactions;

thus, by the updating in real-time of the cache on the client computer, refraining from database locks in the server of the cloud-based video recording.

2. The computerized method of claim 1, wherein when the screen event is a start recording request to record screen events of an interaction, the compliance-enforcement module further comprising checking the masked state that is stored in the cache, when the masked state is positive, the updating of the cache comprising updating with an associated interaction identifier of the interaction that a recording has started, and it is masked and when the mask state is negative, the updating of the cache comprising updating with the associated interaction identifier of the interaction that a recording has started and the operating of the module of recording of screen events comprising starting of recording screen events of the interaction.

3. The computerized method of claim 1, wherein when the screen event is a masking request on behalf of a voice interaction, the updating the cache comprising updating the masked state in the cache as positive, and the operating of the module of recording of screen events comprising pausing of recording screen events on the client computer.

4. The computerized method of claim 3, wherein the updating of the masked state in the cache as positive further comprising updating each interaction identifier of the voice interaction in a start-pause time of the masking request.

5. The computerized method of claim 1, wherein when the screen event is an unmasking request on behalf of a voice interaction the updating the cache comprising updating the masked state in the cache as negative and the operating the module of recording of screen events comprising resuming of recording screen events on the client computer.

6. The computerized method of claim 5, wherein the updating of the masked state in the cache as negative further comprising updating each interaction identifier of the voice interaction in an end-pause time of the masking request.

7. The computerized method of claim 1, wherein when the screen event is a stop request on behalf of a voice interaction by an associated interaction identifier, due to an end of the voice interaction, and when the masked state is positive, the operating of the module of recording of screen events comprising resuming of recording screen events of any other interaction.

8. The computerized method of claim 7, wherein upon receiving an unmasking request from the server the updating of the cache comprising updating the masked state in the cache as negative.

9. The computerized method of claim 1, wherein when the screen event is a stop request for a voice interaction or a digital interaction by an associated interaction identifier and when the mask state is negative:

the operating of the module of recording of screen events comprising stopping of recording screen events for the voice or digital interaction;

(ii) operating a module to upload the screen recording with related data from the cache to the server of the cloud-based video recording; and (iii) the updating of the cache comprising deleting the associated interaction identifier of the voice interaction from the cache.

10. The computerized method of claim 9, wherein the related data from the cache includes recording start time, one or more start time and ending time of masking and recording end time.

11. The computerized method of claim 1, wherein the one or more digital interactions include at least one of: chat, email, live video and messaging services.

12. The computerized method of claim 1, wherein when the screen event is a stop request on behalf of a voice interaction by an associate interaction identifier due to an internal interaction, and when the masked state is positive, the operating of the module of recording of screen events will not comprise resuming of recording screen events of any interaction.

13. A computerized system for providing real-time lockless parallel screen recording compliance enforcement to omni channel cloud systems, the computerized system comprising:

a processor of a client computer;

a cache for storing a masked state, wherein the cache in maintained by said processor of the client computer: and a server of a cloud-based video recording;

said processor is configured to execute code for recording events of one or more voice or digital interactions, on one or more screens associated to the client computer, maintaining, upon receiving a screen event from the server of a cloud-based video recording that is communicating with the client computer over a communication network, operating a compliance-enforcement module, said compliance-enforcement module is configured to:

update the cache; and operate a module of recording of screen events for the screen events of the one or more voice or digital interactions;

thus, by the updating in real-time of the cache on the client computer, refraining from database locks in the server of the cloud-based video recording.

* * * * *